United States Patent
Yamamoto

[19]

[11] Patent Number: 6,130,868

[45] Date of Patent: *Oct. 10, 2000

[54] APPARATUS AND METHOD FOR CONTROLLING ROTATIONAL SPEED DURING A PAUSE OPERATION

[75] Inventor: Etsufumi Yamamoto, Chiba, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,682

[22] Filed: Oct. 8, 1997

[30] Foreign Application Priority Data

Oct. 11, 1996 [JP] Japan ................................ 8-269882

[51] Int. Cl.$^7$ .................................................. G11B 7/085
[52] U.S. Cl. .................................. 369/54; 369/50; 369/47
[58] Field of Search .................................. 369/50, 47, 54, 369/32, 58, 48; 386/105, 15, 17; 383/106

[56] References Cited

U.S. PATENT DOCUMENTS

| | | | |
|---|---|---|---|
| 5,453,972 | 9/1995 | Kanazawa et al. | 369/219 |
| 5,787,225 | 7/1998 | Honjo | 386/105 |

FOREIGN PATENT DOCUMENTS 404205963A   7/1992   Japan .

*Primary Examiner*—Thang V. Tran
*Attorney, Agent, or Firm*—Limbach & Limbach L.L.P.

[57] ABSTRACT

In a disc drive for use in a disc recording/reproduction apparatus in which information is recorded to and/or reproduced from a disc, the rotational speed of the disc when a pause operation is performed is smaller than the rotational speed of the disc when information is recorded to or reproduced from the disc.

24 Claims, 3 Drawing Sheets

APPARATUS AND METHOD FOR CONTROLLING ROTATIONAL SPEED DURING A PAUSE OPERATION

BACKGROUND OF THE INVENTION

1. Field of the Invention

The present invention relates to a disc drive used when information is recorded to and/or reproduced from a disc recording medium such as a compact disc-read only memory (hereinafter referred to as a "CD-ROM"), and a disc recording/reproduction apparatus in which the disc drive is used.

2. Description of the Related Art

Conventional CD-ROM reproduction apparatuses for CD-ROMs include a type in which a disc rotational speed used to increase a data reading speed is increased to an n-fold speed, such as one with a rotational speed being twice the normal rotational speed (hereinafter referred to as the "normal speed"), which is hereinafter referred to as a "double speed", or one with a rotational speed being four times the normal speed, which is hereinafter referred to as a "fourfold speed".

When such a type of CD-ROM reproduction apparatus increases the disc rotational speed to the n-fold speed such as the double speed or the fourfold speed in a reproduction condition, a high-frequency signal read by an optical pick-up is greatly affected by a surface swinging and decentering of a disc due to vibration, and such disturbances may remarkably disturb a tracking error signal as shown in FIG. 3B.

Accordingly, a pause operation performed based on the tracking error signal, or a one-track jump for the optical pick-up to stay on the same track of the disc may fail. Failure in the pause operation hinders the optical pick-up from staying on the same track of the disc, which causes inconvenience in which, when the operation is released, reproduction of a music or the like cannot be started at a point with the pause operation performed.

According to the conventional CD-ROM reproduction apparatuses, in general, when the pause operation fails, the pause operation is retried at the same point of the disc, with the disc rotational speed maintained. This manner causes the problem of a low possibility that the pause operation succeeds correctly at the retried position.

SUMMARY OF THE INVENTION

Accordingly, it is an object of the present invention to provide a disc drive and a disc recording/reproduction apparatus which have an enhanced possibility of a pause operation succeeding.

To this end, according to an aspect of the present invention, the foregoing object has been achieved through provision of a disc drive for use in a disc recording/reproduction apparatus in which information is recorded to and/or reproduced from a disc, wherein the rotational speed of the disc when a pause operation is performed is smaller than the rotational speed of the disc when information is recorded to or reproduced from the disc.

The disc drive may be used for a CD-ROM drive having an n-fold rotational speed.

According to another aspect of the present invention, the foregoing object has been achieved through provision of a disc recording/reproduction apparatus in which information is recorded to and/or reproduced from a disc, wherein the rotational speed of the disc when the disc recording/reproduction apparatus performs a pause operation is smaller than the rotational speed of the disc when information is recorded to or reproduced from the disc.

The disc recording/reproduction apparatus may be used for a CD-ROM recording/reproduction apparatus having an n-fold rotational speed.

In the disc drive and the disc recording/reproduction apparatus, when information is recorded to or reproduced from the CD-ROM the CD-ROM is rotated at the n-fold rotational speed, and when the pause operation is performed the rotational speed of the CD-ROM is smaller than the n-fold rotational speed.

According to the disc drive and disc recording/reproduction apparatus of the present invention, the rotational speed of a disc when a pause operation is performed is less than the rotational speed of the disc when information is recorded to or reproduced from the disc. Thus, the influence of a surface swinging and decentering of the disc, caused by vibration when the pause operation is performed at a large rotational speed, can be reduced. Accordingly, a stable tracking-error signal can be obtained, which enhances a possibility of the pause operation succeeding.

In addition, by decreasing the rotational speed in order for the pause operation to succeed, less heat is generated by the spindle motor and the motor driver circuit, and consequently the casing does not become as hot. Thus, it is possible to prevent a problem in which each component overheats and its life shortens.

DESCRIPTION OF THE PREFERRED EMBODIMENT

The present invention will be described below, based on the attached drawings.

Figure 1:
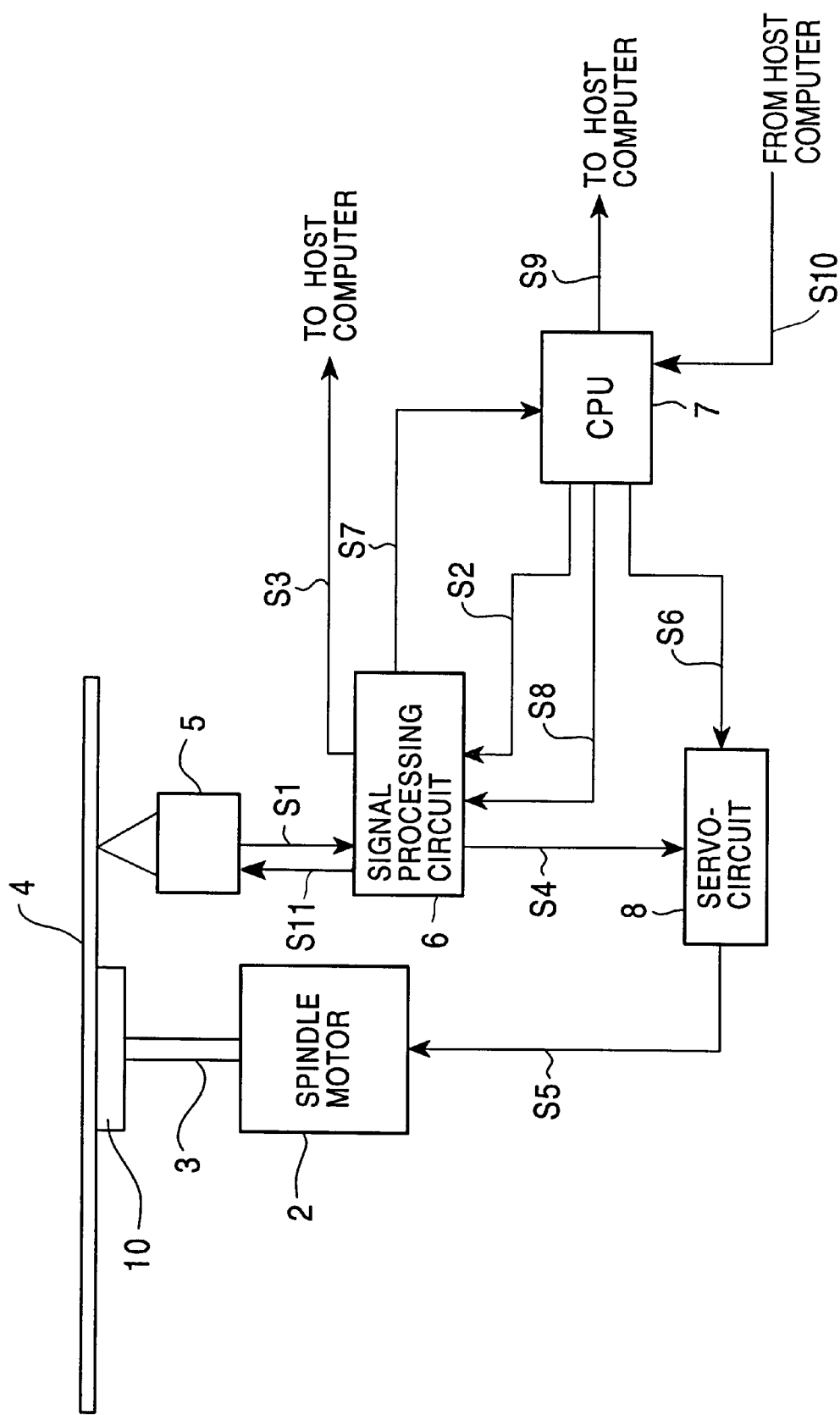
FIG. 1 is a block diagram showing a CD-ROM reproduction apparatus including a disc drive, according to an embodiment of the present invention.
Figure 2:
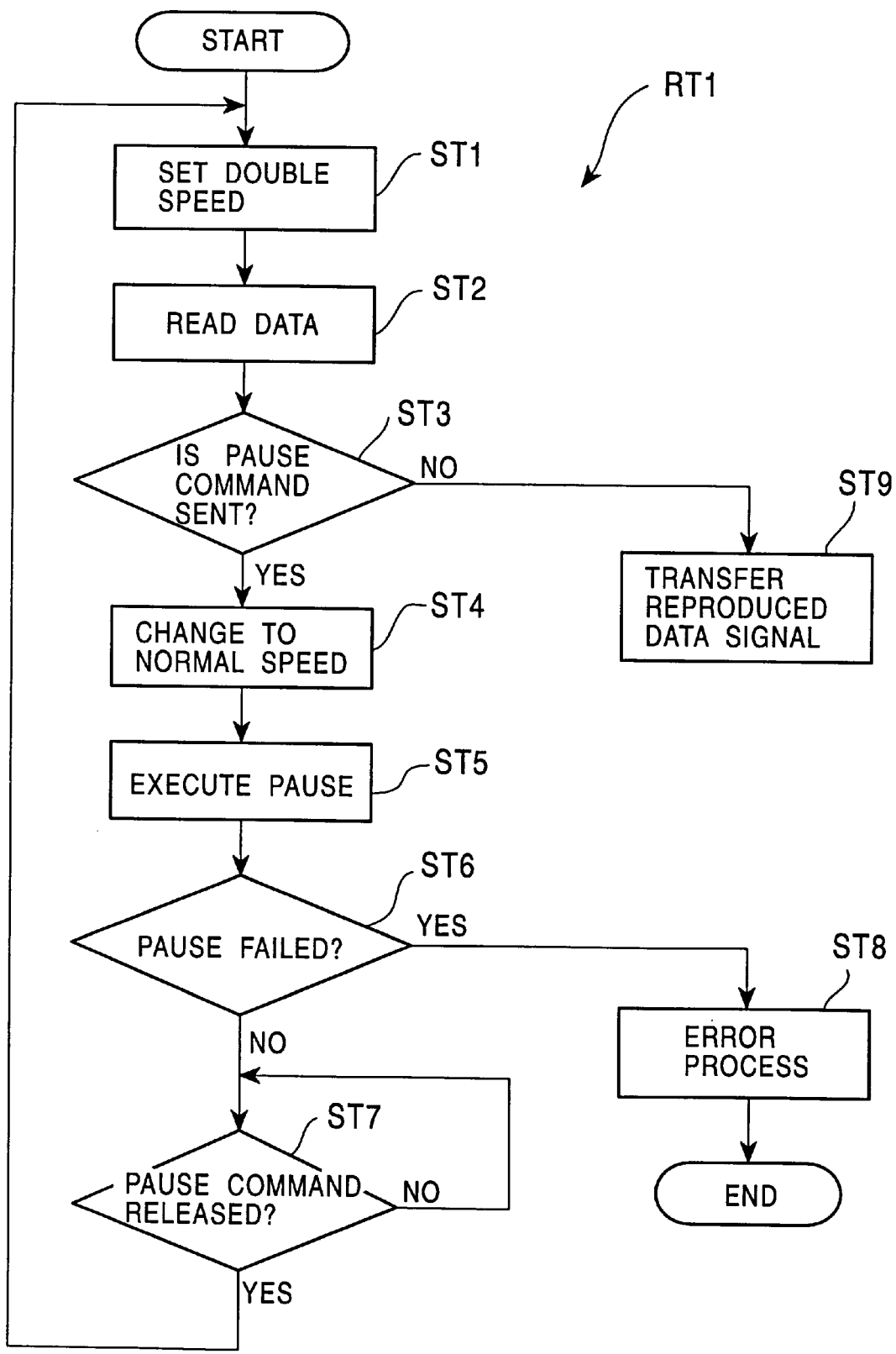
FIG. 2 is a flowchart showing a control process by a CPU in operation of the CD-ROM reproduction apparatus shown in FIG. 1.

FIGS. 1 and 2 show a CD-ROM reproduction apparatus including a disc drive, according to an embodiment of the present invention.

As shown in FIG. 1, in the CD-ROM reproduction apparatus 1 (a disc drive and a disc reproduction apparatus), a CD-ROM 4 mounted on a turntable 10 connected to the spindle 3 of a spindle motor 2 is driven at the double speed in reproduction condition.

Data (information) recorded on the CD-ROM 4 is read by an optical pick-up 5, and a resultant data-detection signal S1 is sent to a signal processing circuit 6.

The signal processing circuit 6 processes the data-detection signal S1 in the double-speed or normal-speed mode in accordance with a reproduction-speed-mode control signal S2 supplied from a microcomputer central-processing unit (hereinafter referred to as a "CPU") 7, and generates pause control signal S11 to control the optical pick-up 5 to pause in accordance with a pause command signal S8.

A reproduced data signal S3 obtained by the signal processing circuit 6 is output to a host computer (not shown), and when the pause operation is performed the reproduced data signal S3 is muted to generate no sound in the host computer.

The signal processing circuit 6 sends to a servo circuit 8 a subframe frequency signal separated from the data-detection signal S1 as a rotational-speed detection signal S4 from the CD-ROM 4 with the optical pick-up 5 reading.

In accordance with a rotational-speed-switching control signal S6 input from the CPU 7 and the rotational-speed detection signal S4, the servo circuit 8 sends a rotational-speed control signal S5 to the spindle motor 2, so the spindle motor 2 rotates the CD-ROM 4 at the double speed or the normal speed.

The signal processing circuit 6 also supplies a pause-error result signal S7 to the CPU 7 whenever the optical pick-up 5 pauses with respect to the CD-ROM 4 in order to notify the CPU 7 of whether or not an error occurs in the pause operation.

According to the embodiment of the present invention, the CD-ROM reproduction apparatus 1 has a control process RT1 (shown in FIG. 2) stored in a ROM built into the CPU 7. In the CD-ROM reproduction apparatus 1 the reproduced data signal S3 to be sent to the host computer is read and the pause operation is executed by executing the control process RT1.

After the main power is switched on or the CD-ROM 4 is exchanged, the CPU 7 initially starts executing the control process RT1. In step ST1 the CPU 7 sets the rotational speed of the CD-ROM 4 to the double speed, and in step ST2 the CPU 7 controls the optical pick-up 5 to perform a data reading operation with a laser beam.

If there is a pause-operation command signal S10 from the host computer (YES in step ST3), in step ST4 the CPU 7 outputs the rotational-speed-switching control signal S6 to the servo circuit 8 so as to reduce the rotational speed of the spindle 3 of the spindle motor 2 from the double speed to the normal speed.

In step ST5 the CPU 7 outputs the reproduction-speed-mode control signal S2 and the pause command signal S8 to the signal processing circuit 6 so that the signal processing circuit 6 processes the data-detection signal S1 in the normal-speed mode and generates pause control signal S11 to control the optical pick-up 5 to execute the pause operation, or to perform a one-track jump for staying on the same position on the CD-ROM 4.

In step ST6 the CPU 7 determines whether or not the pause operation has had an error (the pause operation has failed), based on the pause-error result signal S7. If the CPU 7 has determined that the pause operation had no error (the pause operation has succeeded), in step ST7 determination of whether or not the pause command has been released is performed. If the pause command has not been released the pause operation continues until the pause command is released. If the pause command has been released the control process RT1 returns to its start, and the steps after step ST1 are repeated.

In step ST6, if the CPU 7 has determined that the pause operation failed, an error process is performed in step ST8, and the pause error signal S9 is sent to the host computer.

In step ST3 if the CPU 7 has determined that there is no pause signal from the host computer, in step ST9 the signal processing circuit 6 performs signal processing based on the data-detection signal S1 from the optical pick-up 5, and sends the reproduced data signal S3 to the host computer.

Figure 3A:
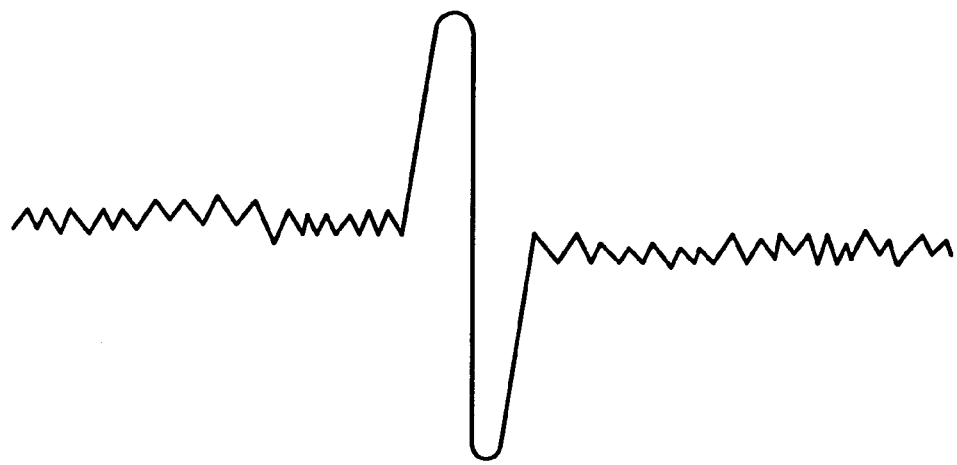
FIGS. 3A and 3B are waveform charts showing the waveform of a normal tracking error signal and the waveform of an abnormal tracking error signal caused by external disturbances, respectively.
Figure 3B:
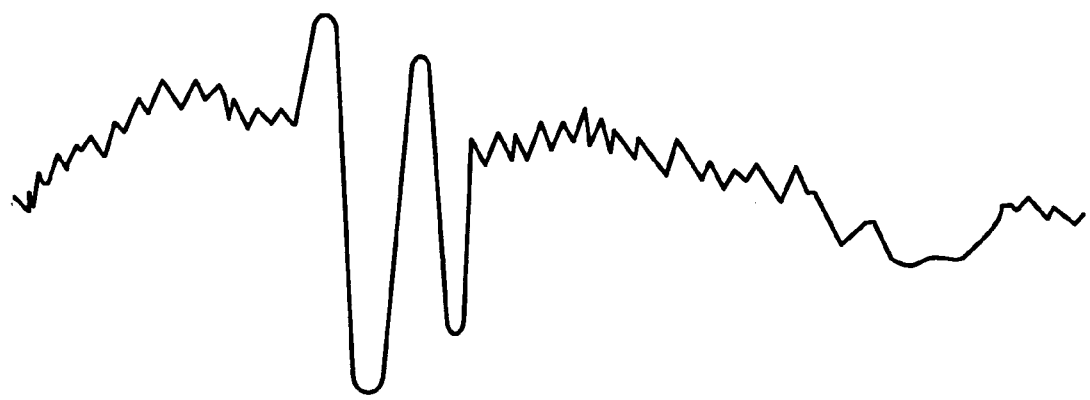

According to the embodiment of the present invention, the rotational speed of the CD-ROM 4 in the pause operation is less than the rotational speed of the CD-ROM 4, which is needed for data reproduction from the CD-ROM 4. Thus, the influence of a surface swinging and decentering of the CD-ROM 4, caused by vibration occurring when the pause operation is performed at a large rotational speed, can be reduced. Accordingly, a stable tracking-error signal as shown in the waveform chart of FIG. 3A can be obtained, which enhances a possibility that the pause operation succeeds.

The above-described embodiment has described the case where the operation of reading data from the CD-ROM 4 is performed at the double speed, and the pause operation is performed at the normal speed which is reduced from the double speed. However, the present invention is not limited to the described case but can be applied to a case where in a disc reproduction apparatus whose disc rotational speed in reproducing data is, e.g., an eightfold speed more than the double speed, the disc rotational speed in the pause operation is reduced from the eightfold speed to a sixfold or sevenfold speed, or a case where the disc rotational speed is further reduced to an n-fold speed or normal speed, and after the pause operation succeeds the disc rotational speed is increased back to the sixfold, sevenfold or eightfold speed. And, the present invention can be applied to similar cases.

Although the above-described embodiment has described the case where the rotational speed (angular velocity) of the CD-ROM 4 is controlled, the present invention is not limited to such control of the rotational speed but can be applied to cases where on a track of the CD-ROM 4 at which the optical pick-up 5 is positioned a constantly maintained linear velocity is increased or reduced, or both the rotational speed and the linear velocity are controlled.

In addition, the above-described embodiment has described the CD-ROM reproduction apparatus 1 which reads data on the CD-ROM 4 with the optical pick-up 5. However, the present invention is not limited to the mentioned type of disc and apparatus but can be applied to disc drives and disc recording/reproduction apparatuses in which data is recorded to or reproduced from various types of disc recording media such as CD's, laser discs and magneto-optic discs, whether data are recorded on or reproduced from the media with light or magnetism.

What is claimed is:

1. A disc drive for use in a high-speed disc recording or reproduction apparatus, comprising:

rotation means for rotating a disc;

reproduction means for reproducing information from the disc;

pausing means for performing a pause operation; and controlling means for controlling the rotation means to rotate the disc at a higher speed when information is reproduced from the disc, the higher speed being greater than the normal rotational speed of a disc drive, and to rotate the disc at a lower speed when a pause operation is performed, the lower speed also being greater than the normal rotational speed of a disc drive;

wherein the reproduction means comprises a head; and wherein a radial position of the head at a time just prior to a pause operation is approximately the same as a radial position of the head during the pause operation.

2. A disc drive according to claim 1, wherein:

the disc drive is a compact disc-read only memory (CD-ROM) drive; and the controlling means controls the rotation means to rotate the disc at an n-fold rotational speed as compared to the normal rotational speed of a CD-ROM drive when information is reproduced from the CD-ROM, and to rotate the CD-ROM at a speed smaller than the n-fold rotational speed when the pause operation is performed, the lower speed also being greater than the normal rotational speed of a disc drive.

3. A high-speed disc recording/reproduction apparatus, comprising:

rotation means for rotating a disc;

reproduction means for reproducing information from the disc;

pausing means for performing a pause operation; and controlling means for controlling the rotation means to rotate the disc at a higher speed when information is reproduced from the disc, the higher speed being greater than the normal rotational speed of a disc drive, and to rotate the disc at a lower speed when a pause operation is performed, the lower speed also being greater than the normal rotational speed of a disc drive;

wherein the reproduction means comprises a head; and wherein a radial position of the head at a time just prior to a pause operation is approximately the same as a radial position of the head during the pause operation.

4. The apparatus of claim 3, wherein:

the apparatus is for reproducing information from compact disc-read only memory (CD-ROM) drive; and the controlling means controls the rotation means to rotate the disc at an n-fold rotational speed as compared to the normal rotational speed of a CD-ROM drive when information is reproduced from the CD-ROM, and to rotate the CD-ROM at a speed smaller than the n-fold rotational speed when the pause operation is performed, the lower speed also being greater than the normal rotational speed of a disc drive.

5. The disc drive of claim 1, wherein the reproduction means comprises a head which remains in approximately the same position during a pause operation.

6. The disc drive of claim 1, further comprising tracking means for enabling the reproduction means to reproduce data from a desired track.

7. The disc drive of claim 6, wherein the tracking means is enabled during a pause operation.

8. The disc drive of claim 6, wherein the reproduction means comprises a head and the tracking means moves the head approximately one track during a pause operation.

9. The disc drive of claim 1, wherein the higher rotational speed is approximately twice the normal speed.

10. The disc drive of claim 1, wherein the reproducing means generates a reproduced data signal which is muted during a pause operation.

11. A disc drive for use in a disc recording/reproduction apparatus, comprising:

a spindle motor for rotating a disc at a higher rotational speed in response to a higher-speed mode rotational speed control signal or a lower rotational speed in response to a lower-speed mode rotational speed control signal, wherein the lower rotational speed is lower than the higher rotational speed and higher than or approximately equal to a normal rotational speed of a disc drive;

a head for reproducing information from the disc, for generating a data detection signal and for pausing in response to a pause control signal;

a signal processing circuit for processing the data detection signal in a lower-speed mode or a higher-speed mode in accordance with a reproduction speed mode control signal, for generating the pause control signal in accordance with a pause command signal, and for generating a reproduced data signal and a rotational speed detection signal;

a central processing unit for receiving the pause operation command signal from a host computer and for generating the pause command signal, the reproduction speed mode control signal and the rotational speed switching control signal, wherein the central processing unit generates the reproduction speed mode control signal and the rotational speed switching control signal in higher-speed mode when the head is reproducing information from the disc and in lower-speed mode after receiving a pause operation command from the host computer; and a servo circuit for receiving the rotational speed detection signal and the rotational speed switching control signal, for generating the lower-speed mode rotational speed control signal in response to a lower-speed mode switching control signal and for generating the higher-speed mode rotational speed control signal in response to a higher-speed mode switching control signal.

12. A disc drive according to claim 11, wherein the disc drive is a compact disc-read only memory (CD-ROM) drive.

13. The disc drive of claim 11, wherein the head remains in approximately the same position during a pause operation.

14. The disc drive of claim 11, further comprising a tracking circuit for positioning the head to reproduce data from a desired track.

15. The disc drive of claim 14, wherein the tracking circuit is enabled during a pause operation.

16. The disc drive of claim 14, wherein the tracking circuit moves the head approximately one track during a pause operation.

17. The disc drive of claim 11, wherein the lower rotational speed is approximately equal to the normal speed of a disc drive.

18. The disc drive of claim 11, wherein the higher rotational speed is approximately twice the lower rotational speed.

19. The disc drive of claim 11, wherein the signal processing circuit mutes the reproduced data signal during a pause operation.

20. The disc drive of claim 11, wherein the head can both reproduce and record data to the disc, and wherein the head reproduces and records data to the disc when the disc is rotating at the higher rotational speed.

21. The disc drive of claim 11, wherein:

the signal processing circuit supplies a pause error result signal to the central processing unit when the head pauses; and the central processing unit determines, based on the pause error result signal, whether an error has occurred in the pause operation.

22. The disc drive of claim 11, wherein the central processing unit sends a pause error signal to the host computer if the central processing unit determines that an error has occurred in the pause operation.

23. A method of improving the reliability of a pause operation in a high-speed disc reproducing apparatus, comprising the steps of:

rotating the disc at a higher speed when information is reproduced from the disc, the higher speed being greater than the normal rotational speed of a disc drive; and rotating the disc at a lower speed when a pause operation is performed, the lower speed also being greater than the normal rotational speed of a disc drive;

wherein the reproduction means comprises a head; and wherein a radial position of the head at a time just prior to a pause operation is approximately the same as a radial position of the head during the pause operation.

24. A method of improving the reliability of a pause operation in a high-speed disc recording and reproducing apparatus, comprising the steps of:

rotating the disc at a higher speed when information is recorded or reproduced from the disc, the higher speed being greater than the normal rotational speed of a disc drive; and rotating the disc at a lower speed when a pause operation is performed, the lower speed also being greater than the normal rotational speed of a disc drive;

wherein the reproduction means comprises a head; and wherein a radial position of the head at a time just prior to a pause operation is approximately the same as a radial position of the head during the pause operation.

* * * * *